(12) United States Patent
Veldkamp et al.

(10) Patent No.: US 6,672,837 B1
(45) Date of Patent: Jan. 6, 2004

(54) WIND TURBINE WITH OSCILLATION DAMPING MEANS

(75) Inventors: Herman F. Veldkamp, Randers (DK); Lars Risager, Egå (DK); Flemming Rasmussen, Roskilde (DK)

(73) Assignee: NEG Micon A/S, Randers (DK)

( * ) Notice: Subject to any disclaimer, the term of this patent is extended or adjusted under 35 U.S.C. 154(b) by 0 days.

(21) Appl. No.: 09/701,493
(22) PCT Filed: May 31, 1999
(86) PCT No.: PCT/DK99/00289
§ 371 (c)(1), (2), (4) Date: Jun. 13, 2001
(87) PCT Pub. No.: WO99/63219
PCT Pub. Date: Dec. 9, 1999

(30) Foreign Application Priority Data

May 29, 1998 (DK) .......................................... 1998 00715

(51) Int. Cl.$^7$ ............................................. F04D 29/00
(52) U.S. Cl. .................... 416/144; 416/244 A; 416/500
(58) Field of Search ...................... 415/119; 416/244 A, 416/244 R, 144, 145, 248, 500

(56) References Cited

U.S. PATENT DOCUMENTS

| 4,042,070 | A |   | 8/1977 | Flannelly |
| 4,515,525 | A | * | 5/1985 | Doman .......................... 416/11 |
| 4,527,951 | A |   | 7/1985 | Trier |
| 4,766,984 | A |   | 8/1988 | Gaffey et al. ................ 158/380 |
| 4,822,245 | A |   | 4/1989 | Aubry et al. |
| 4,935,651 | A |   | 6/1990 | Hong et al. |

FOREIGN PATENT DOCUMENTS

| EP | 0008585  | 8/1979 |
| EP | 0075877  | 9/1982 |
| WO | 97/01709 | 1/1977 |
| WO | 95/21327 | 8/1995 |
| WO | 97/03288 | 1/1997 |

* cited by examiner

Primary Examiner—Edward K. Look
Assistant Examiner—Dwayne White
(74) Attorney, Agent, or Firm—Birch, Stewart, Kolasch & Birch, LLP

(57) ABSTRACT

The present invention relates to a wind turbine with oscillation damping means provided at the nacelle and being designed for damping edgewise oscillations of the rotor blades in the rotational plane of the rotor. In particular, the invention relates to a wind turbine in which the oscillation damping means are provided at the end of the nacelle being opposite to the end from which the rotor extends and are designed for damping oscillations of the first eigenfrequency of the rotor blades in the rotational plane, especially oscillations being perpendicular to the rotational axis of the rotor. The damping means are advantageously designed to dampen oscillations of a frequency being substantially equal to the first eigenfrequency in the rotational plane of the at least one blade minus the frequency of rotation of the rotor. The oscillation damping means of the present invention are preferably capable of damping oscillations being substantially horizontal and substantially perpendicular to the rotation axis.

32 Claims, 10 Drawing Sheets

WIND TURBINE WITH OSCILLATION DAMPING MEANS

Figure 1:
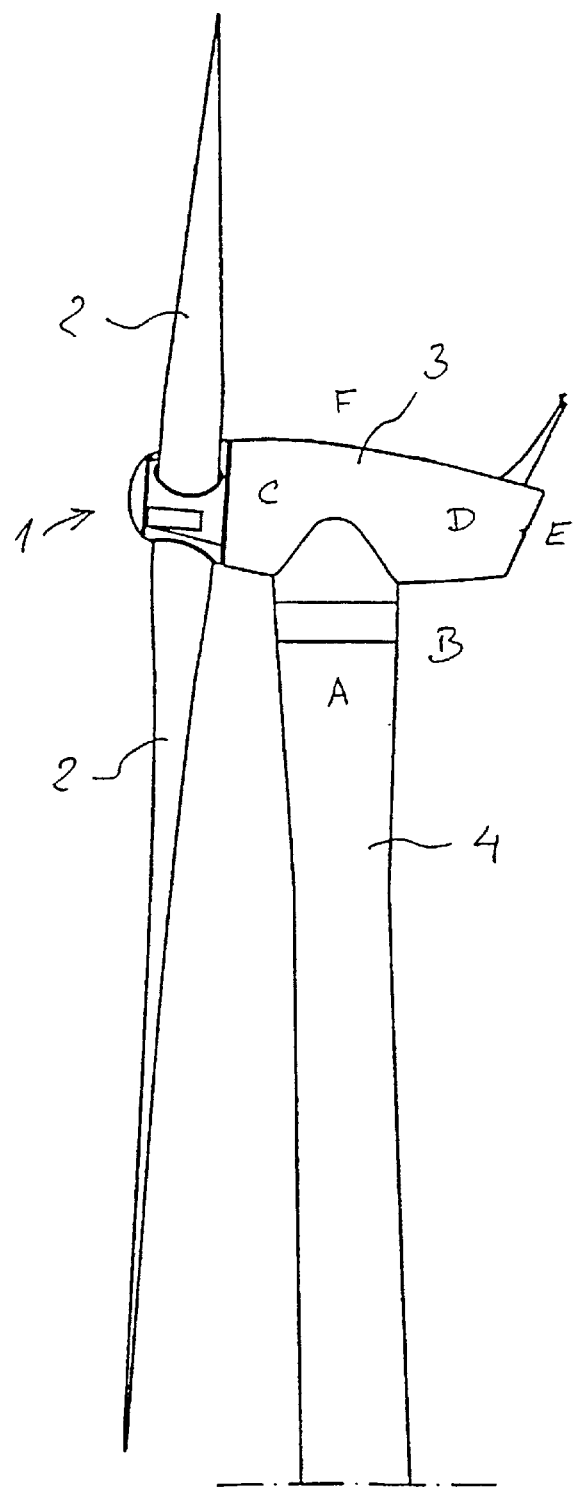

This application is the national phase under 35 U.S.C. § 371 of PCT International Application No. PCT/DK99/00289 which has an International filing date of May 31, 1999, which designated the United States of America.

The present invention relates to a wind turbine with oscillation damping means provided at the nacelle and being designed for damping edgewise oscillations of the rotor blades in the rotational plane of the rotor.

In particular, the invention relates to a wind turbine in which the oscillation damping means are provided at the end of the nacelle being opposite to the end from which the rotor extends and are designed for damping oscillations of the first eigenfrequency of the rotor blades in the rotational plane, especially oscillations being perpendicular to the rotational axis of the rotor.

BACKGROUND

Undesired oscillations may occur in wind turbines for power generation. These oscillations may include the entire turbine, i.e. several parts are oscillating in a combined mode, or the oscillations may occur locally in single part. Of particular severity are oscillations in the rotor blades either edgewise (in the rotor plane), flapwise (perpendicular to the rotor plane), or in a combined edge- and flapwise mode. Whether these oscillations do occur is dependent on the wind turbine design and the meteorological conditions.

Blade oscillations may be dampened by building a damping device into the blades, such as described in WO-A-95/21327, but it is difficult to produce a feasible design that is sufficiently compact and flat in order to satisfy the severe spatial restrictions. Furthermore, to build in a damper into existing blades is difficult and expensive.

The oscillation phenomena may cause dangerously high loads on the blade and other parts of the wind turbine, which may lead to a sudden collapse or alternatively may be the cause of fatigue damage and lifetime reduction, as cracks in the components slowly grow ultimately leading to failure. The occurrence of oscillations adds an uncertainty factor to predictions of lifetime loads on the various parts of a wind turbine, making it necessary to make the design stronger and heavier than would otherwise be the case.

DESCRIPTION OF THE INVENTION

Oscillations of the blades in the rotational plane of the rotor, the edgewise oscillations, are particular severe and may cause sudden fracture of the base part of the blades and may under unfortunate circumstances cause blades to break off the rotor.

The edgewise oscillations of the blades cause the centre of gravity of the rotor to oscillate, and the oscillations are transmitted to the nacelle on which the rotor is arranged. An alternative to dampening of the oscillations by arranging damping means in the blades have been found to be dampening of the oscillations of the nacelle. By arranging oscillation damping means at the nacelle for damping oscillations of an appropriate frequency the oscillations of the blades may be dampened to a harmless level since the nacelle and the rotor oscillates together.

This technical solution of the problems of edgewise blade oscillations is advantageous because it may be installed in existing wind turbines contrary to dampers in the blades, it is an inexpensive solution and an oscillation damping means in the nacelle may easily be accessed for adjustment and maintenance.

It is an object of the present invention to provide dampening of edgewise oscillations of the blades of a wind turbine by oscillation damping means arranged at the nacelle of the wind turbine.

Thus, the present invention relates to a wind turbine comprising a foundation, a tower extending substantially vertically and being mounted at a lower end on the foundation, a nacelle supported by an upper end of the tower, a wind rotor having at least one blade arranged on a main shaft having a substantially horizontal rotation axis and being arranged at the nacelle with the wind rotor extending from one end of the nacelle, the at least one blade defining a rotational plane being perpendicular to the rotation axis, and oscillation damping means provided at the nacelle and being designed for damping oscillations of the at least one blade in the rotational plane.

The oscillation damping means may be arranged inside the nacelle or on the outside of the nacelle, mainly depending on the spatial restrictions inside the nacelle. However, it is for most wind turbines advantageous that the oscillation damping means are arranged at the end of the nacelle being opposite to the end from which the rotor extends because the nacelle is arranged pivotally on the tower about a central vertical yawing axis and the amplitude of the horizontal oscillations of the nacelle increases with the horizontal distance to the yawing axis for which reason oscillation damping means are more efficient at this position. Alternatively, the oscillation damping means could be arranged anywhere near the periphery of the nacelle, even at the end at which the rotor extends from the nacelle.

The oscillation damping means should be capable of at least damping oscillations being substantially horizontal and substantially perpendicular to the rotation axis since the oscillations of the rotor caused by the edgewise oscillations of the blade(s) are perpendicular to the rotation axis. The vertical oscillations are normally dampened sufficiently by the stiffness of the vertical connection between the nacelle and the tower, whereas the horizontal oscillations are less dampened because the yawing arrangement commonly has a certain clearance.

The oscillation damping means are preferably designed for damping oscillations of a frequency being substantially equal to the first eigenfrequency in the rotational plane of the at least one blade minus the frequency of rotation of the rotor. This mode has in most cases by experiment and simulations proven to be the frequency having the largest amplitude. However, for some construction it has be found to be advantageous to, alternatively or additionally to this frequency, to design the oscillation damping means for damping oscillations of a frequency being substantially equal to the first eigenfrequency in the rotational plane of the at least one blade plus the frequency of rotation of the rotor.

In case both of the aforementioned frequencies should be dampened, a favourable embodiment of the oscillation damping means comprises first damping means designed for damping oscillations of a frequency being substantially equal to the first eigenfrequency in the rotational plane of the at least one blade minus the frequency of rotation of the rotor and second damping means connected to an oscillating mass element of the first damping means and being designed for damping oscillations of a frequency being substantially equal to the first eigenfrequency in the rotational plane of the at least one blade plus the frequency of rotation of the rotor The second damping means may with such an arrangement be design much smaller that the first damping means, the oscillating mass of the second damping means being typically of about a tenth of the oscillating mass of the first damping means.

The oscillation damping means are in preferred embodiments designed for damping oscillations of a frequency deviating less than 0.2 Hz, preferably less than 0.1 Hz and most preferred less than 0.03 Hz from the first eigenfrequency in the rotational plane of the at least one blade minus, respectively plus, the frequency of rotation of the rotor.

The frequency of the oscillations that the oscillation damping means are designed for damping may be of variable frequency and comprise means for varying said frequency at least according to variations of the frequency of rotation of the rotor. Such means could be means for varying the mass of a mass element by pumping a liquid such a water to and from a liquid container arranged on or constituting the mass element.

The oscillation damping means are suitably designed for damping oscillations of a frequency in the range of 0.5–4 Hz, preferably in the range of 1–3 Hz.

The oscillation damping means should be designed for damping oscillations of the at least one blade in the rotational plane so that the oscillations at all operating conditions are dampened to a harmless amplitude level. This may be obtained with a damping of a magnitude being equivalent to a logarithmic decrement of oscillations of the first eigenfrequency in the blade(s) comprised within the rotor of preferably at least 1.5% and most preferred of at least 2.5%. The logarithmic decrement of oscillations of the first eigenfrequency in the blade(s) is typically of an order of 2–4% and the maximum aerodynamic excitation of the blades is typically of an order or 5–7%. The sum of the logarithmic decrement of oscillations of the first eigenfrequency in the blade(s) and the damping by means of the oscillation damping means should be sufficient to counteract the aerodynamic excitation. On the other hand, the damping by means of the oscillation damping means should not be too excessive to ensure that the oscillation damping means react to and counteract oscillations of minor amplitudes which may cause fatigue of parts of the wind turbine. The above-mentioned sum should therefore not be much higher than the aerodynamic excitation of the blade(s) in question and typically of an order of 6–8%.

The oscillation damping means may according to the present invention be capable of damping oscillations in more than one direction. The direction may be controlled by adjusting the damping means, such as, e.g., by turning the damping means about a vertical axis, or the oscillation damping means may be capable of damping oscillations in more than one direction simultaneously. Furthermore, the oscillation damping means may be constructed in a symmetric or asymmetric configuration, exhibiting different or identical resonance frequencies in two or more different directions.

It is in general preferred to employ oscillation damping means comprising at least one mass element and/or at least one spring element and/or at least one damper element. The oscillation damping means may be of a variety of configurations, such as comprising

- a directional movable mass element connected to the nacelle by a helical spring element and a shock absorber,
- a pendulous mass element pivotally mounted in one end of one or more arms, the other end of said arm or arms being pivotally mounted to a frame, where the assembly points between the arms and the frame and/or the mass element are provided with resilient elements,
- a mass element supported by one or more resilient columns, preferably consisting of one or more steel members combined with one or more members made of plastic, rubber or the like in a layered construction, such as a sandwich construction,
- a mass element arranged as a pendulum connected to an input shaft of a gearbox having an output shaft connected to a hydro-coupling,
- an elongated mass element of a magnetic material arranged inside a coil electrically connected to a resistor, said mass element being mounted to the nacelle, preferably over a helical spring,
- a liquid container mounted to the nacelle, where the liquid in said container constitutes the mass element, the damper element and the spring element,
- a pendulous mass element suspended in a suspension member, such as a rubber pipe, or
- a container with a concave bottom surface provided with one or more toothed bars that are in engagement with at least one gear wheel cylindrical mass element that can roll along the bottom surface, said container being at least partly filled with a damping material, such as a liquid.

In a preferred embodiment of the present invention, the oscillation damping means comprise at least one helical spring connected to the nacelle at a first end and connected to a mass element at the other end, the mass element being supported vertically by at least one wheel member which by its rim engages a damper element being a resilient material. In a further preferred embodiment, the oscillation damping means comprise at least two helical springs connected to the nacelle each at a first end and extending in substantially opposite directions from the first ends, the other end of each spring being connected to a common mass element so that the two springs are in a pre-tensioned state.

The wind turbine according to the invention may for safety, for monitoring as well as for control purposes comprises

- an oscillation sensor for detecting oscillations of the rotor and producing an output accordingly,
- a control unit for receiving the output from the oscillation sensor and having means for determining, by use of the output, whether a predefined safety condition is fulfilled and means for regulate the operation of the wind turbine in case the safety condition is fulfilled, and
- data storage means for storing data being significant of the output of at least a time period previous to a moment of fulfilment of said condition.

The oscillation sensor, such as an accelerometer, may according to the invention be used to evaluate the performance of the oscillation damping means of a wind turbine by outputting the stored data being significant of the output of the sensor for a time period immediately previous to the moment where the condition was fulfilled and analysing said data. The oscillation damping means may by use of the method be evaluated in a situation in which it did not perform satisfactory, e.g. in which the amplitude of the oscillations reached an unsatisfactory level and the operation of the wind turbine was stopped, and its performance may be analysed from the data of the last time period, such as, e.g., the last minute or so before the moment of fulfilment of the safety condition. The oscillation damping means may be adjusted as a result of the analysis, e.g. by adjustment of the mass of the mass element of the oscillation damping means.

The invention also regards a method of damping oscillations at least in a rotational plane of a wind turbine rotor comprising at least one blade by means of applying oscillation damping means at the nacelle according to any the above disclosed embodiments.

Figure 2:
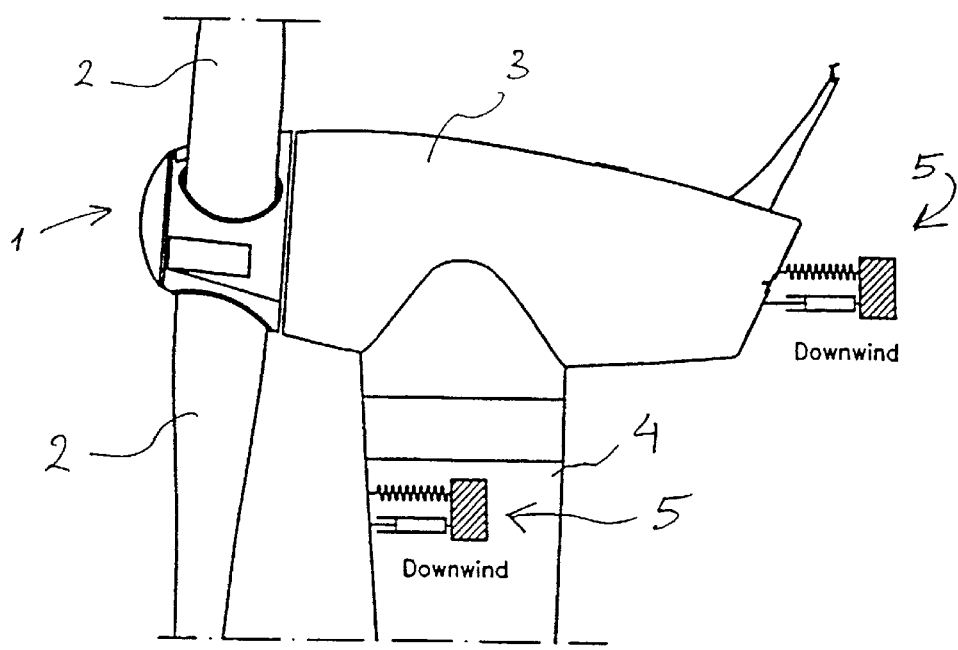
Figure 3:
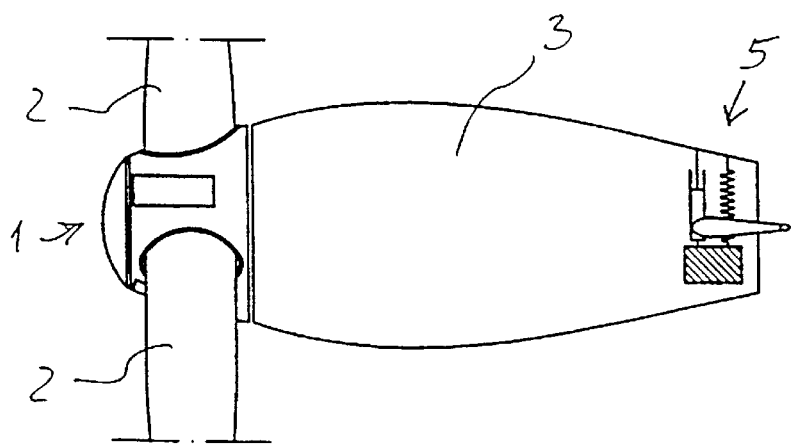
Figure 4:
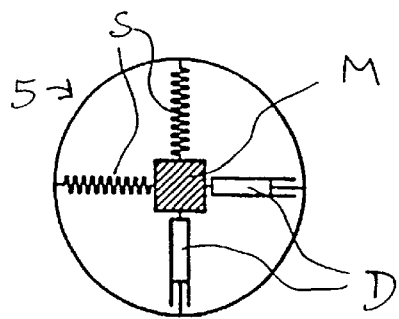
Figure 12:
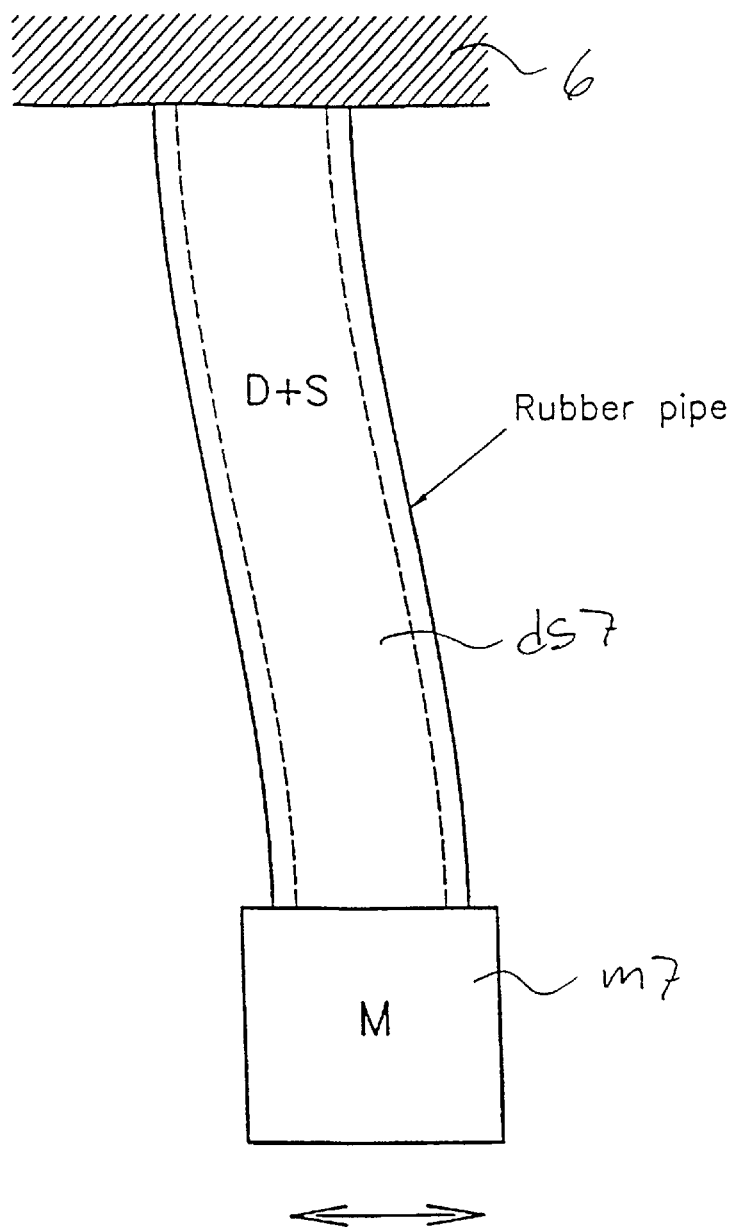
Figure 13:
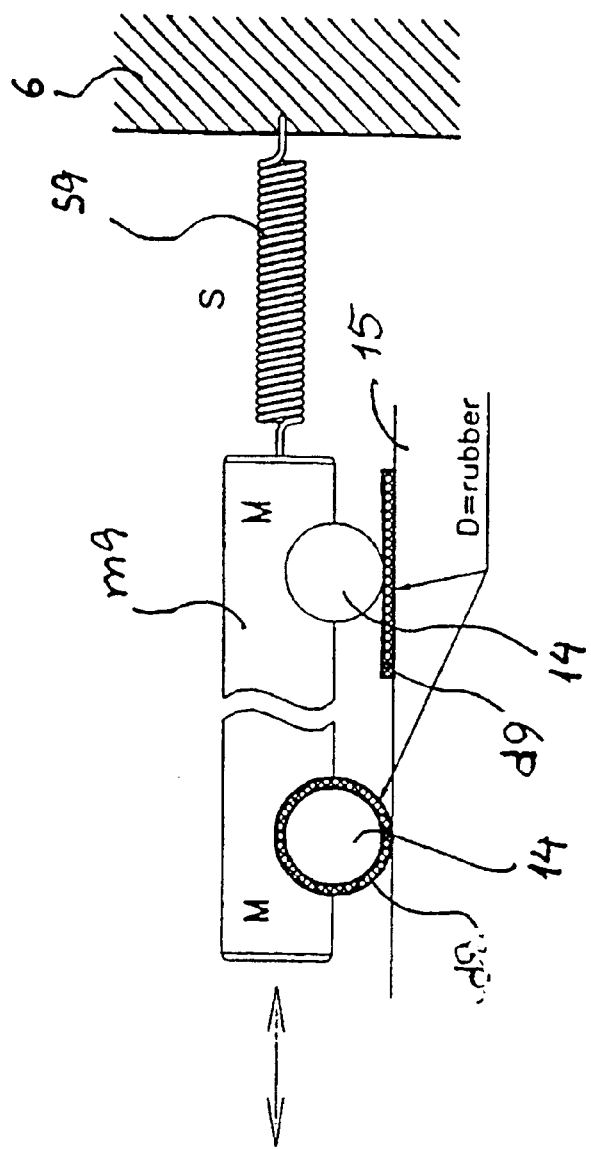
Figure 14:
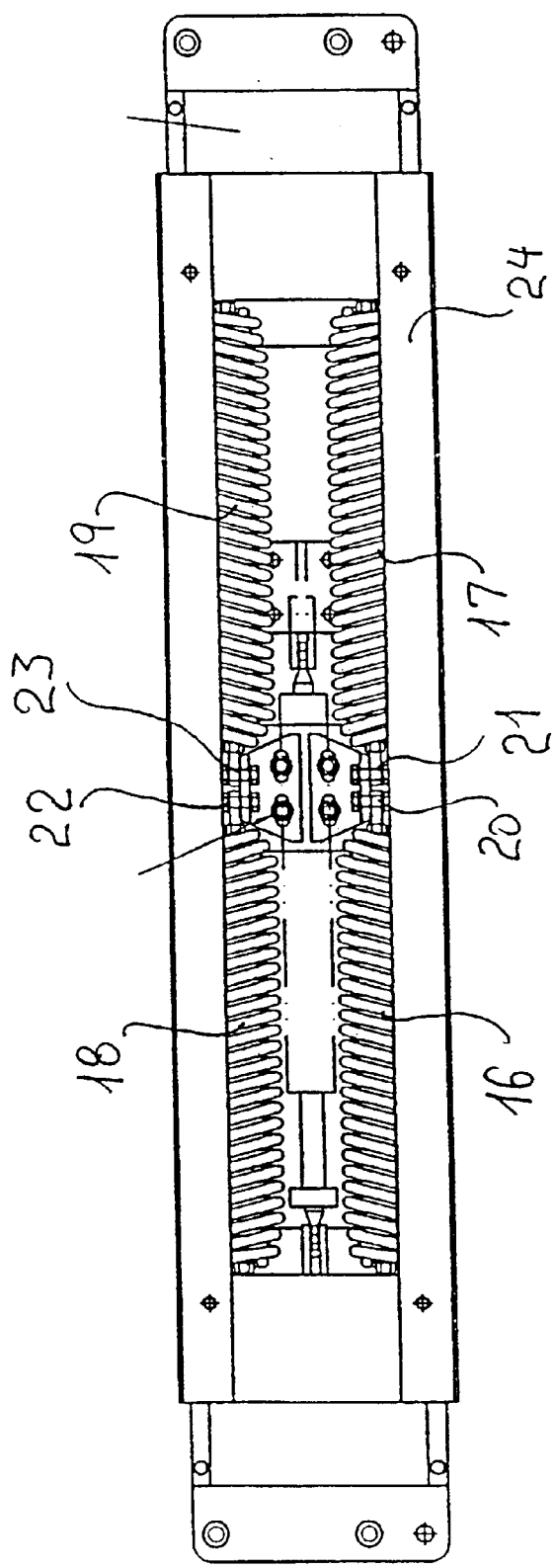
Figure 15:
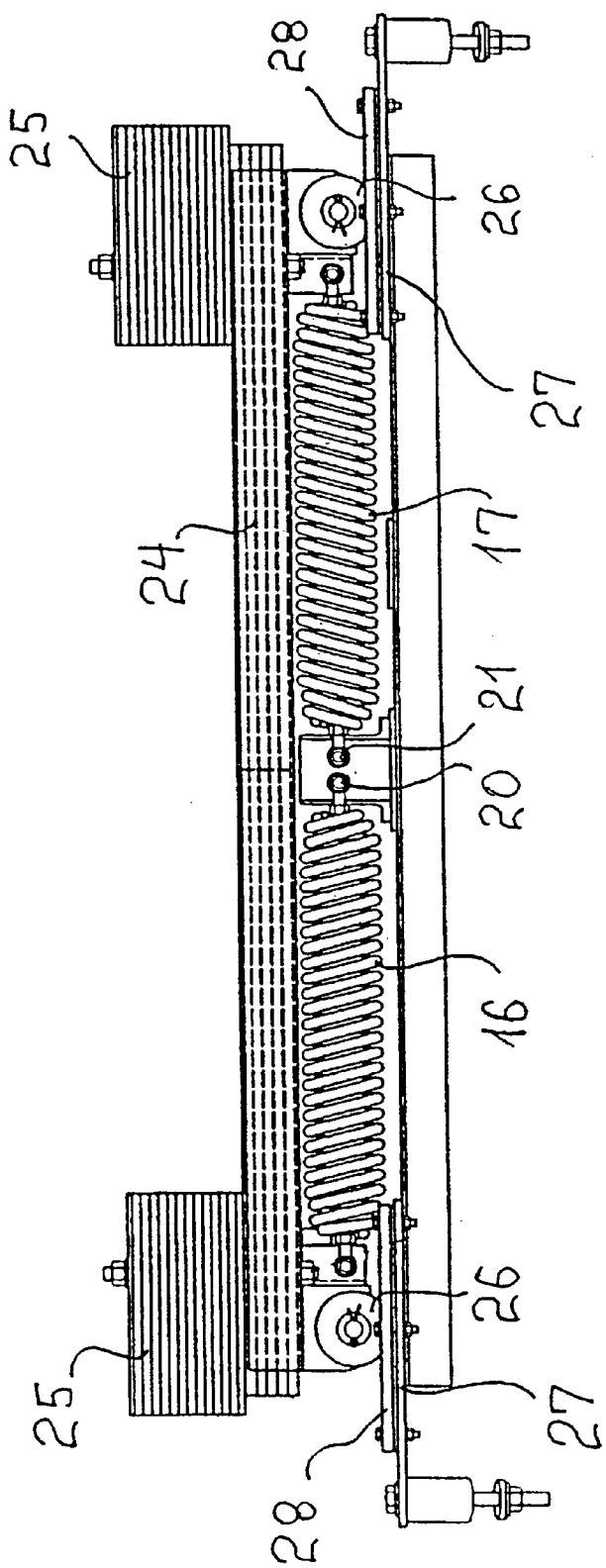

The invention is in the following explained in more detail with reference to the accompanying drawings, in which:

FIG. 1 shows a wind turbine according to the invention,

FIG. 2 shows a side view of the nacelle of a wind turbine according to the invention, FIG. 3 shows a top view of the nacelle, FIG. 4 shows a schematic view of a two directional damping device according to a preferred embodiment of the invention, FIGS. 5–13 shows various preferred embodiments of a damping device according to the invention, and FIGS. 14–15 shows the most preferred embodiment of a damping device according to the invention.

FIG. 1 shows a wind turbine having a rotor 1 comprising a number of blades 2. The rotor 1 is arranged at a nacelle 3 placed on the top of a tower 4. The wind turbine according to the invention comprises oscillation damping means 5 at one or more of the positions A–F.

In FIGS. 2 and 3 two positions of the damping device 5 are shown. In a preferred embodiment of a wind turbine according to the invention the damping device 5 is placed in the end of the nacelle 3 opposite the rotor 1. The damping device is shown in more detail in FIG. 5. It is positioned with the mass element m1 downwind from the rotor. In addition to or as an alternative to the position in the nacelle 3 the damping device can also be placed in the tower.

In FIG. 4 is shown a damping device having a mass M suspended in two spring elements S and two damping elements D.

Figure 5:
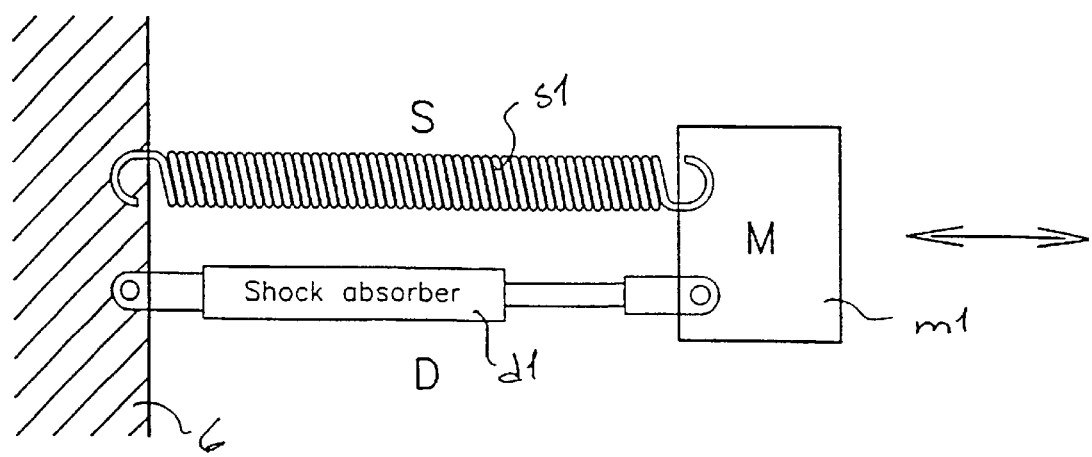

In FIG. 5 a tuned damping device according to one of the preferred embodiments of the invention is shown. A mass element m1 is arranged in a position where it is movable sideways. It is connected to the frame of the nacelle (or the tower) via a spring s1 and a shock absorber d1 arranged parallel to the spring s1.

Figure 6:
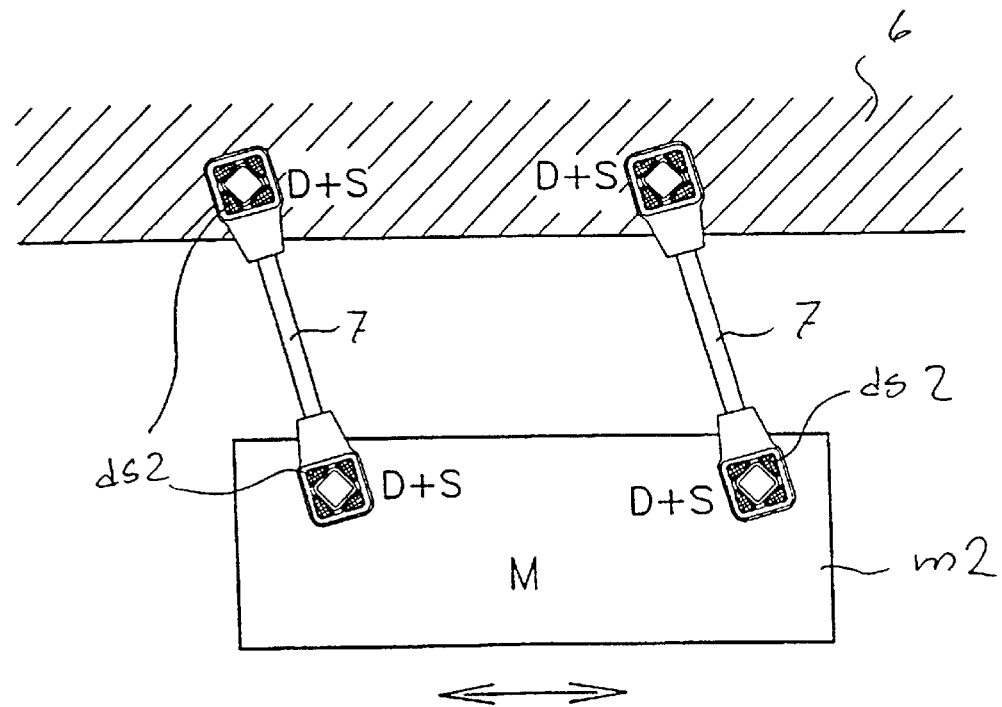

In FIG. 6 another embodiment is shown, where the mass element m2 can swing from side to side. It is suspended in to the frame 6 via two arms 7. The arms 7 are connected to the frame and/or to the mass m2 via an essentially square rod at the mass m2 or the frame 6 and an oversized essentially square mounting opening in the ends of the arms 7. Between an mounting opening in the arms 7 and the square rod of the mass m2/frame 6 a number of fittings ds2 made from a resilient material are arranged.

Figure 7:
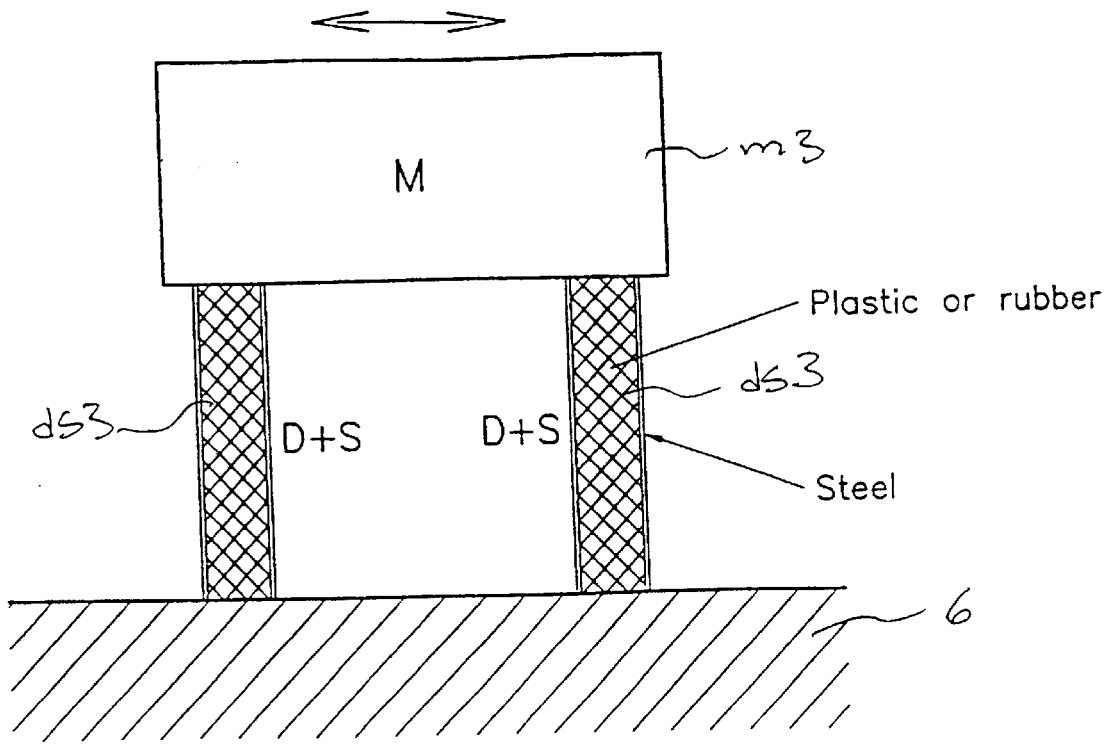

In the embodiment of FIG. 7 the mass element m3 is placed on two columns ds3, that are made of a rubber or plastic core in a steel shell (sandwich construction).

Figure 8:
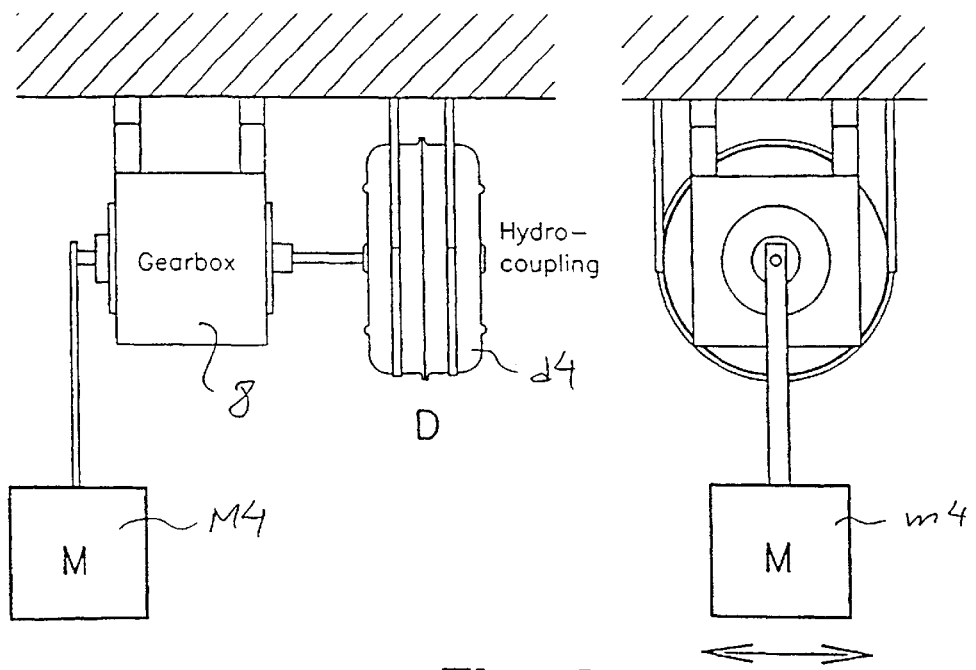

In FIG. 8 the mass element m4 is pendulously arranged and connected to the input shaft of a gearbox 8. The output shaft of the gearbox is connected to a hydro-coupling d4, whereby the pendulating mass m4 is damped.

Figure 9:
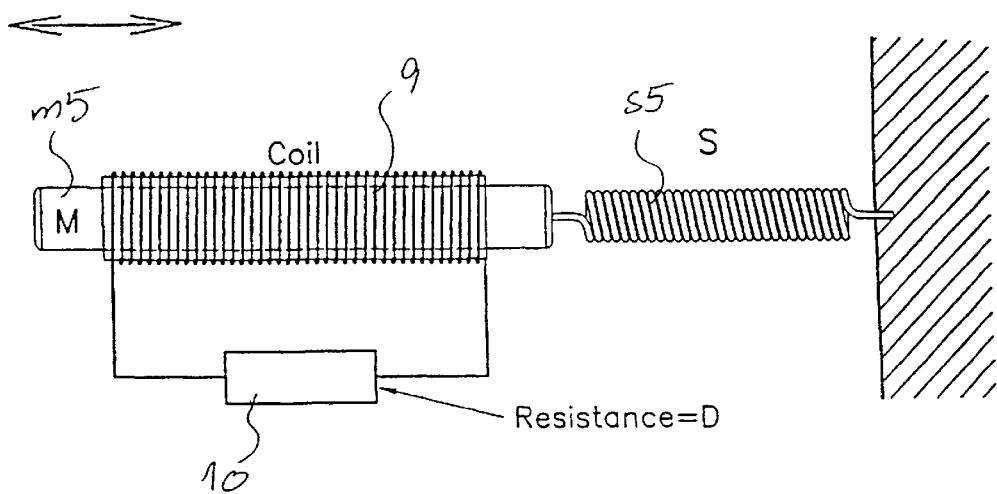

In FIG. 9 an electrical damping device is shown. When the magnetic (or non-magnetic) mass element m5 is shifted from side to side a current is generated in the coil 9. The coil is connected to a resistance 10. By choosing the size of the resistance 10 the amount of damping can be regulated.

Figure 10:
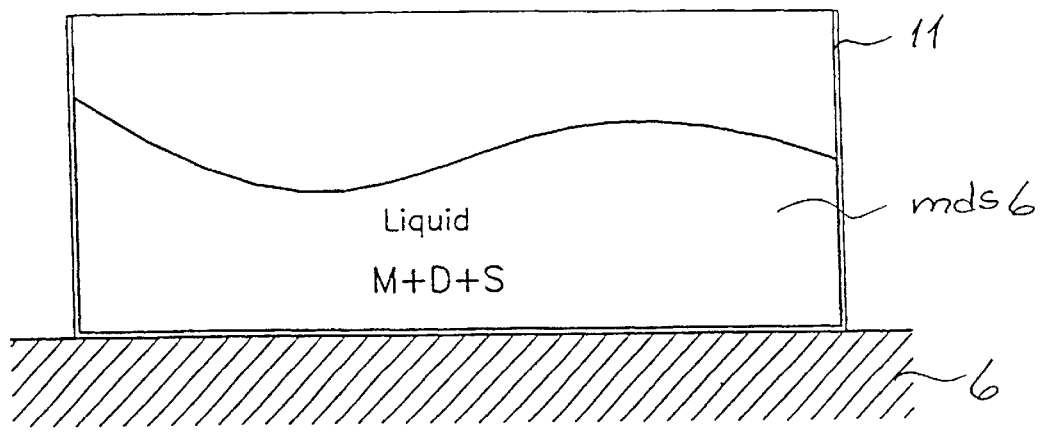

In FIG. 10 an embodiment is shown, where a liquid container 11 is placed on the frame 6. The liquid mds6 in the container 11 served as both mass, damper and spring element in the tuned damping device.

Figure 11:
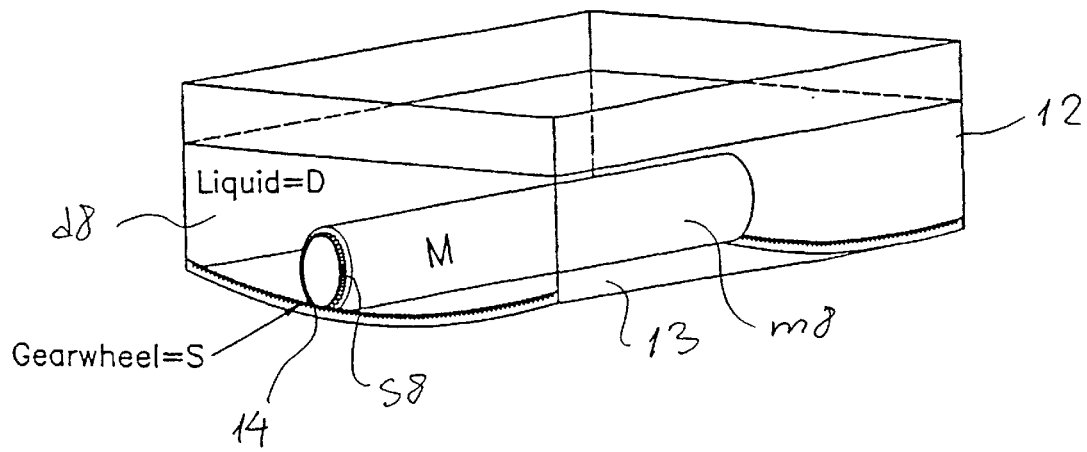

In FIG. 11 a variation of the embodiment of FIG. 10 is shown where the container bottom is concave and fitted with a toothed bar 14 at the two opposite ends of the container bottom. A cylindrical mass element m8 is arranged in the container 12. The mass element m8 is provided with a gear wheel s8 at each end, that are in meshing contact with a corresponding toothed bar 14. The mass m8 can roll along the bottom 13 of the tank 12. The container 12 is at least partly filled with a damping liquid d8.

In FIG. 12 a mass element m7 is hanging in a rubber pipe ds7 serving both as a damping and spring means of the tuned damper according to the invention.

In FIG. 13 an embodiment is shown which consists of a conventional mass-helical spring system, as indicated by m9 and s9. Damping action is provided by deformation of the rubber d9, which may be placed on the wheels 14, on the rails 15, or both.

A most preferred embodiment of the oscillation damping device is shown in FIG. 14, as seen from above, and in FIG. 15 in a side view. The device comprises four helical springs 16–19 arranged in parallel in a direction being perpendicular to the rotation axis of the rotor. Each of the four springs 16–19 is fixed to a frame part of the nacelle at a first end 20–23 and is fixed to a mass-carrying frame part 24 of the device, the frame part 24 carrying two mass elements 25 and is allowed to oscillate relatively to the frame part of the nacelle. The other end of the springs extend as pairs 16, 17 and 18, 19 in opposite directions and the springs 16–19 are pre-tensioned with a compression force when mounted to the frame part 24 of the device. The frame part 24 of the device is supported by means of four wheels 26 on a rail part 27 resting on the frame part of the nacelle. The rail parts are covered with pieces of rubber 28 (preferably Volculan) on which the wheels 26 rest and the deformation of the rubber 28 during movement of the wheels 26 on the rail parts 27 contributes to the damping of the oscillations.

What is claimed is:

1. A wind turbine comprising:
   a foundation,
   a tower extending substantially vertically and being mounted at a lower end on the foundation,
   a nacelle supported by an upper end of the tower,
   a wind rotor having at least one blade arranged on a main shaft having a substantially horizontal rotation axis and being arranged at the nacelle with the wind rotor extending from one end of the nacelle, the at least one blade defining a rotational plane being perpendicular to the rotation axis, and
   oscillation damping means provided at the nacelle and being designed for damping oscillations of the at least one blade in the rotational plane of the at least one blade, wherein the oscillation damping means are designed for damping oscillations of at least at one of a lower frequency and an upper frequency, wherein;
   (a) if the lower frequency oscillations are dampened, the lower frequency is substantially equal to the first eigenfreguency in the rotational plane of the at least one blade minus a frequency of rotation of the rotor, or
   (b) if the upper frequency oscillations are dampened, the upper frequency is substantially equal to the first eigenfrequency in the rotational plane of the at least one blade plus the frequency of rotation of the rotor.

2. The wind turbine according to claim 1, wherein the oscillation damping means are arranged inside the nacelle.

3. The wind turbine according to claim 1, wherein the oscillation damping means are arranged outside the nacelle.

4. The wind turbine according to claim 1, wherein the oscillation damping means are arranged at the end of the nacelle being opposite to the end from which the rotor extends.

5. The wind turbine according to claim 1, wherein the oscillation damping means are capable of damping oscillations being substantially horizontal and substantially perpendicular to the rotation axis.

6. The wind turbine according to claim 1, wherein the oscillation damping means are designed for damping oscillations of both the lower frequency and the upper frequency.

7. The wind turbine according to claim 1, wherein the oscillation damping means comprises first damping means designed for damping oscillations of a frequency being substantially equal to the first eigenfrequency in the rotational plane of the at least one blade minus the frequency of rotation of the rotor and second damping means connected to an oscillating mass element of the first damping means and being designed for damping oscillations of a frequency being substantially equal to the first eigenfrequency in the rotational plane of the at least one blade plus the frequency of rotation of the rotor.

8. The wind turbine according to claim 1, wherein the oscillation damping means are designed for damping oscillations of variable frequency and comprise means for varying said frequency at least according to variations of the frequency of rotation of the rotor.

9. The wind turbine according to claim 1, wherein the oscillation damping means are designed for damping oscillations of a frequency deviating less than 0.2 Hz from the first eigenfrequency in the rotational plane of the at least one blade minus, respectively plus, the frequency of rotation of the rotor.

10. The wind turbine according to claim 9, wherein the oscillation damping means are designed for damping oscillations of a frequency deviating less than 0.1 Hz from the first eigenfrequency in the rotational plane of the at least one blade minus, respectively plus, the frequency of rotation of the rotor.

11. The wind turbine according to claim 9, wherein the oscillation damping means are designed for damping oscillations of a frequency deviating less than 0.03 Hz from the first eigenfrequency in the rotational plane of the at least one blade minus, respectively plus, the frequency of rotation of the rotor.

12. The wind turbine according to claim 1, wherein the oscillation damping means are designed for damping oscillations of a frequency in the range of 0.5–4 Hz.

13. The wind turbine according to claim 12, wherein the oscillation damping means are designed for damping oscillations of a frequency in the range of 1–3 Hz.

14. The wind turbine according to claim 1, wherein the oscillation damping means are designed for damping oscillations of the at least one blade in the rotational plane with a damping of a magnitude being equivalent to a logarithmic decrement of oscillations of the first eigenfrequency in the at least one blade comprised within the rotor of preferably at least 1.5%.

15. The wind turbine according to claim 14, wherein the oscillation damping means are designed for damping oscillations of the at least one blade in the rotational plane with a damping of a magnitude being equivalent to a logarithmic decrement of oscillations of the first eigenfrequency in the at least one blade comprised within the rotor of preferably at least 2.5%.

16. The wind turbine according to claim 1, wherein the oscillation damping means are capable of damping oscillations in more than one direction.

17. The wind turbine according to claim 16, wherein the oscillation damping means are capable of damping oscillations in more than one direction simultaneously.

18. The wind turbine according to claim 16, wherein the oscillation damping means are constructed in a symmetric or asymmetric configuration, exhibiting different or identical resonance frequencies in two or more different directions.

19. The method of damping oscillations at least in a rotational plane of a wind turbine rotor comprising at least one blade by means of applying oscillation damping means at the nacelle according to claim 1.

20. The wind turbine according to claim 1, wherein the wind turbine comprises an oscillation sensor for detecting oscillations of the rotor and producing an output accordingly,
 a control unit for receiving the output from the oscillation sensor and having means for determining, by use of the output, whether a predefined safety condition is fulfilled and means for regulating the operation of the wind turbine in case the safety condition is fulfilled, and
 data storage means for storing data being significant of the output at least a time period previous to a moment of fulfillment of said condition.

21. The method of evaluating the performance of the oscillation damping means of a wind turbine according to claim 20 by outputting the stored data being significant of the output of the sensor for a time period immediately previous to the moment where a condition was fulfilled and analyzing said data.

22. The wind turbine according to claim 1, wherein the oscillation damping means comprise at least one mass element (M) and/or at least one spring element (S) and/or at least one damper element (D).

23. The wind turbine according to claim 22, wherein the oscillation damping means comprise a directional movable mass element (m1) connected to the nacelle by a helical spring element (s1) and a shock absorber (d1).

24. The wind turbine according to claim 22, wherein the oscillation damping means comprise a pendulous mass element (m2) pivotally mounted in one end of one or more arms, the other end of said at least one arm being pivotally mounted to a frame, where the assembly points between the arms and the frame and/or the mass element (m2) are provided with resilient elements (ds2).

25. The wind turbine according to claim 22, wherein the oscillation damping means comprise a mass element (m3) supported by one or more resilient columns (ds3), preferably consisting of one or more steel members combined with one or more members made of plastic, rubber or the like in a layer construction, such as a sandwich construction.

26. The wind turbine according to claim 22, wherein the oscillation damping means comprise the mass element (m4) arranged as a pendulum connected to an input shaft of a gearbox having an output shaft connected to a hydro-coupling (d4).

27. The wind turbine according to claim 22, wherein the oscillation damping means comprise an elongated mass element (m5) of a magnetic material arranged inside a coil electrically connected to a resistor, said mass element (m5) being mounted to the nacelle, preferably over a helical spring (s5).

28. The wind turbine according to claim 22, wherein the oscillation damping means comprise a liquid container mounted to the nacelle, where the liquid (mds6) in said container constitutes the mass element, the damper element and the spring element.

29. The wind turbine according to claim 22, wherein the oscillation damping means comprise a pendulous mass element (m7) suspended in a suspension member (ds7), such as a rubber pipe.

30. The wind turbine according to claim 22, wherein the oscillation damping means comprise a container with a concave bottom surface provided with one or more toothed bars that are engagement with at least one gear wheel (s8) cylindrical mass element (m8) that can roll along the bottom surface, said container being at least partly filled with a damping material (d8), such as a liquid.

31. The wind turbine according to claim 22, wherein the oscillation damping means comprise at least one helical spring connected to the nacelle at a first end and connected to a mass element at the other end, the mass element being supported vertically by at least one wheel member which by its rim engages a damper element being a resilient material.

32. The wind turbine according to claim 30, wherein the oscillation damping means comprise at least two helical springs connected to the nacelle each at a first end and extending in substantially opposite directions from the first ends, the other end of each spring being connected to a common mass element so that the two springs are in a pre-tensioned state.

* * * * *